United States Patent
Ball

[11] Patent Number: 5,911,447
[45] Date of Patent: Jun. 15, 1999

[54] PIPE CONNECTOR

[76] Inventor: Daniel Graham Ball, 87 Woodland Road, Darlington, County Durham, United Kingdom, DL3 7UA

[21] Appl. No.: 08/617,780
[22] PCT Filed: Sep. 23, 1994
[86] PCT No.: PCT/GB94/02074
§ 371 Date: Mar. 20, 1996
§ 102(e) Date: Mar. 20, 1996
[87] PCT Pub. No.: WO95/09318
PCT Pub. Date: Apr. 6, 1995

[30] Foreign Application Priority Data

Sep. 30, 1993 [GB] United Kingdom ............ 9320208

[51] Int. Cl.⁶ .................... F16L 17/025; F16L 17/10
[52] U.S. Cl. ............................... 285/105; 285/96
[58] Field of Search ................... 285/96, 97, 104, 285/105, 175, 177

[56] References Cited

U.S. PATENT DOCUMENTS

| | | | |
|---|---|---|---|
| 2,531,922 | 11/1950 | Seamark | 285/104 X |
| 3,572,769 | 3/1971 | Lingl | 285/96 |
| 3,582,112 | 6/1971 | Pico | 285/96 |
| 3,711,123 | 1/1973 | Arnold | 285/96 X |
| 3,860,270 | 1/1975 | Arnold | 285/93 |
| 4,381,114 | 4/1983 | Vanderford | 285/96 X |
| 4,466,640 | 8/1984 | Van Houtte | 285/104 |
| 4,676,531 | 6/1987 | Martin | 285/96 |
| 4,805,932 | 2/1989 | Imhof et al. | 285/104 X |
| 5,456,501 | 10/1995 | Reaux | 285/96 |

*Primary Examiner*—John A. Ricci

[57] ABSTRACT

A pipe connector for attachment to a plain end pipe includes a housing (2) for location over the pipe end, an annular recess (4) formed in the inner surface of the housing, an inlet (10) for feeding a fluid under pressure into the recess, a sealing ring (6) in the recess, having at least three arcuate gripper elements (14) bonded thereto, the gripper elements having aligned recesses at the radially inward surfaces in which an O-ring seal (16) is mounted. After a pipe end is placed within the housing, fluid is pumped into the annular space (8) between the housing and seal ring (6), which pushes the seal ring and attached gripper elements radially inwardly to engage the pipe, the O-ring seal (16) forming a tight seal against the pipe. The plurality of gripper elements can conform to a pipe which is not perfectly round.

5 Claims, 3 Drawing Sheets

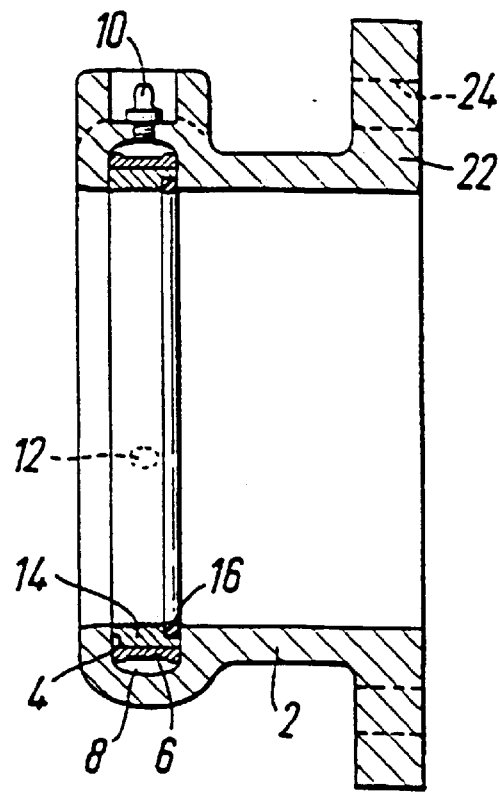
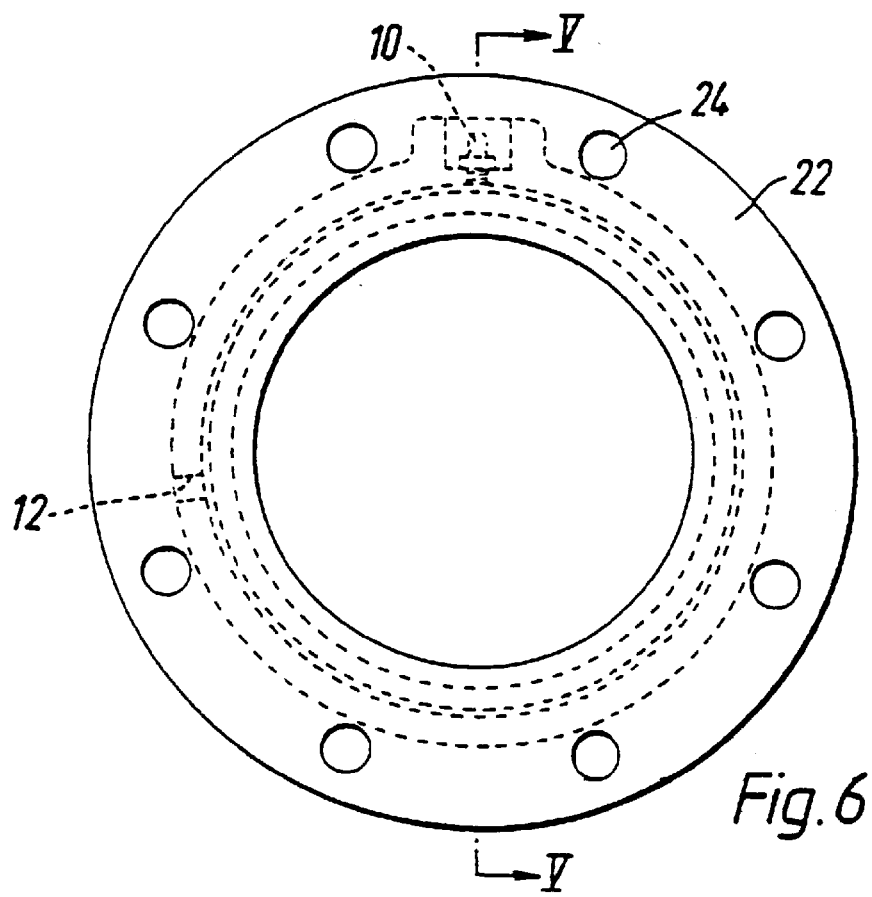

PIPE CONNECTOR

TECHNICAL FIELD

This invention relates to a pipe connector, and more particularly to a connector for attachment at or adjacent the end of a plain end pipe to enable coupling of said pipe to a further pipe, pump, valve or the like.

BACKGROUND ART

It is established practice to provide connectors for plain end pipes which utilise friction rings or hardened grippers to which force is applied by means of associated nuts and bolts. However, with such arrangements, the force applied by the nuts and bolts is often only partially transmitted to the friction ring or gripper, with the result that the pressure rating of the connection is relatively low—typically between 10 and 20 bars—because of the tendency of the pipes to move longitudinally relative to one another.

It has been proposed to alleviate this problem of movement of the pipes by providing fixed anchors for the pipes at regular intervals therealong, but this is a complex, time-consuming and expensive exercise.

More recently, somewhat more efficient connectors have been introduced which utilise a non-compressible fluid such as grease to urge a gripper in the form of a serrated ring of hardened steel into contact with the pipe, such connectors further including additional sealing means for sealing between the connectors and the outer surfaces of the pipes.

For example U.S. Pat. No. 3,582,112 discloses a pipe coupling including gripping means in the form of a pair of semi-circular grippers urged by a separate sealing ring of complex configuration into gripping engagement with the pipe.

However these known arrangements suffer from various disadvantages, not the least of which is that the grippers, being ring-shaped, cannot provide effective gripping around the whole circumference of other than precisely circular pipes, while the sealing means, being separate from the grippers, require independent actuation.

DISCLOSURE OF THE INVENTION

It would be desirable to be able to provide a pipe connector capable of effective attachment to off-circular as well as circular pipes.

According to the present invention there is provided a pipe connector for attachment to a plain end pipe, the connector comprising a housing for location over the pipe, an annular recess formed in the inner surface of the housing to surround the pipe, a first resilient sealing ring located in said annular recess, gripper means located in said recess radially inwardly of said first resilient sealing ring, a second resilient sealing ring reacting between the inner surface of the housing and the pipe, and inlet means feeding into said recess for a supply of fluid under pressure, the arrangement being such that, on the application of fluid under pressure to the first sealing ring, the gripper means are displaced from inoperative positions into operative positions in gripping engagement with the pipe thereby securely to connect the housing to the pipe, the second resilient sealing ring effecting a fluid-tight seal between the pipe and the housing, characterised in that the first sealing ring is disposed between the gripper means and the housing and includes radially inner and outer surfaces the inner of which extends longitudinally of the pipe, the gripper means comprising at least three arcuate segments disposed about the recess and having radially inner and outer surfaces the outer of which extends longitudinally of the pipe, the radially outer surfaces of the segments being engaged by the radially inner surface of the first sealing ring, the radially inner surfaces of the segments having formed therein, at the axial extremities thereof, an annular groove in which the second sealing ring is housed to project radially inwards of the radially inner surfaces of said segments, the arrangement being such that, on the application of fluid under pressure to the radially outer surface of the first sealing ring, the segments are displaced radially inwardly towards the pipe by said first sealing ring into operative positions in which the radially inner surfaces thereof grip the pipe, movement of said segments urging the second sealing-ring radially inwardly towards the pipe into sealing engagement with said pipe and with a sidewall of the housing to effect a fluid-tight seal between the pipe and the housing.

It will thus be appreciated that, with such an arrangement incorporating a plurality of segments, a positive gripping effect can be achieved around other than circular pipes, the individual segments orientating themselves independently of one another and in dependence upon the configuration of the surface of the associated portion of the circumference of the pipe.

Further, the sealing means, being movable with the segments, provides a dynamic sealing arrangement the effect of which increases with increase in fluid pressure applied to the gripper means.

Conveniently the radially outer surface of the first resilient sealing ring is of generally concave configuration whereby, on application of fluid pressure thereto, the opposed side edges of the ring are urged into sealing contact with the opposed sidewalls of the recess.

Preferably the inner surfaces of the segments are serrated and there are between three and sixteen segments, typically six or eight segments, surrounding the pipe, while the fluid under pressure is conveniently grease.

When connecting together two plain end pipes, there may be provided two connectors as detailed above, one of reach pipe, the housings of which are integrated to form a single unit.

In an alternative arrangement, the coupling may include an annular flange integral with, and projecting radially outwardly from, the housing for attachment to a corresponding flange on a component to which the plain end pipe is to be connected.

BRIEF DESCRIPTION OF THE DRAWINGS

FIGS. 5 and 6 are a longitudinal section on line V—V of FIG. 6 and an end view respectively of a third pipe connector according to the invention.

DETAILED DESCRIPTION OF THE PREFERRED EMBODIMENT

Figure 1:
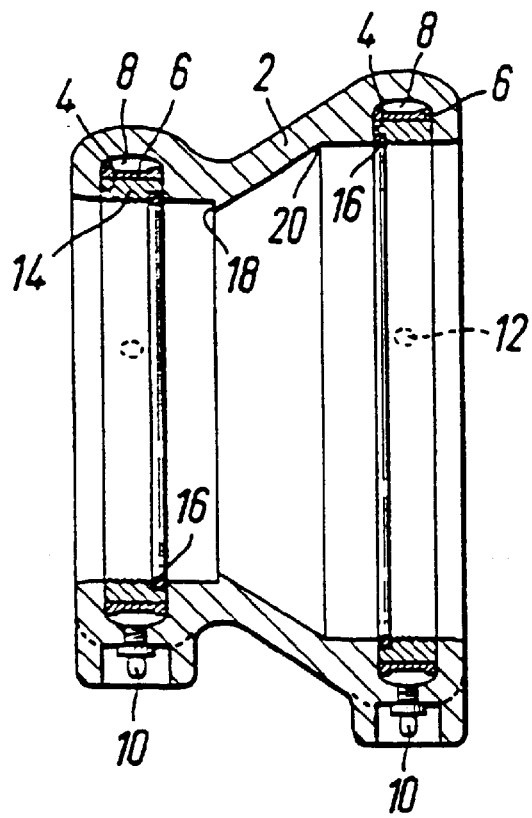
FIGS. 1 and 2 are a longitudinal section on line I—I of FIG. 2 and an end view partly cut-away respectively of a first pipe connector according to the invention.
Figure 2:
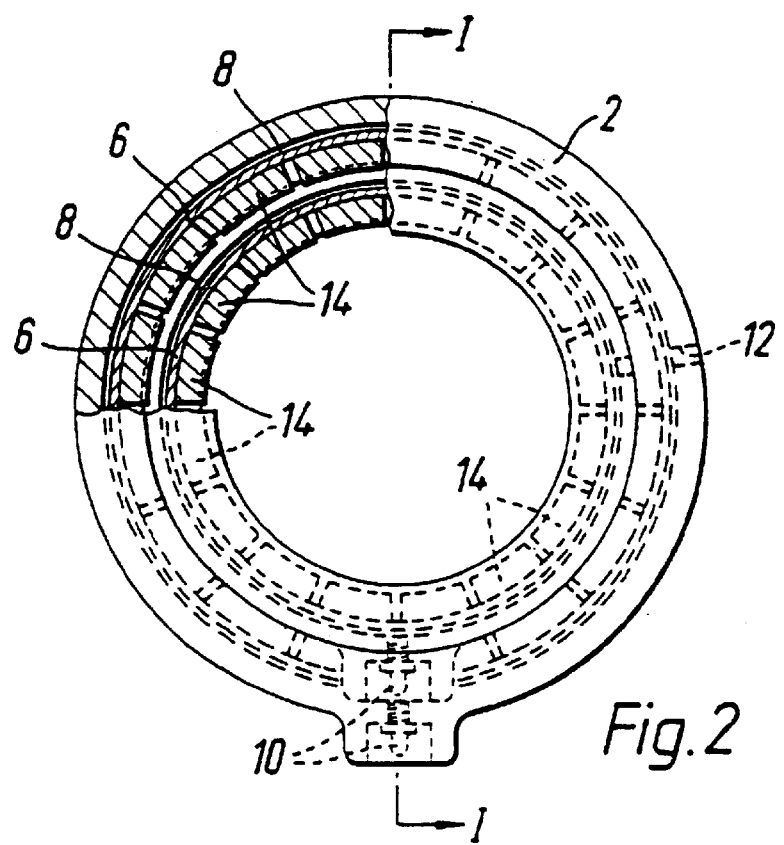

Referring to FIGS. 1 and 2 there is shown a first connector according to the invention for interconnecting two plain end pipes of different external diameters.

More particularly, the connector comprises a hollow metal housing 2 of generally truncated conical shape in each end of which is housed a pipe gripping arrangement, one for each pipe, only one of which arrangements will be described in detail—the other operates in exactly the same way.

An annular groove or recess 4 is formed in the inner surface of the housing 2 adjacent the end thereof and in which is housed a ring 6 of resilient material. The external surface of the ring 6 is of a generally concave configuration, the diameter of the internal surface of the ring 6 is less than the internal diameter of the housing, and the width of the ring 6 is slightly greater than that of the groove 4. An annular volume 8 is defined within the groove 4 between the external surface of the ring 6 and the base of the groove 4, a grease nipple 10 feeding into said volume 8, and a relief bleed screw hole 12 angularly displaced from said nipple 10 feeding from said volume 8.

Bonded to the internal surface of the resilient ring 6 are a plurality of arcuate segments 14 of hardened steel the inner surfaces of which are serrated and, in the rest position of the connector, are located substantially flush with the inner surface of the housing 2.

At best seen in FIG. 2, the segments 14, of which there are 16 in each end of the illustrated connector, are circumferentially spaced from one another to permit a degree of radially-inward movement in the groove 4 before abutment of adjacent segments 14 occurs.

Each segment 14 is internally configured adjacent its edge innermost of the housing 2 to define a recess therein in which is located a continuous 'O'-ring seal 16 which projects from said recess radially inwardly of the serrated inner surfaces of the segments 14.

The described connector operates as follows. The housing 2 is slid over the plain end of the associated pipe which is a close fit in the hollow bore thereof, the end of the pipe abutting a shoulder 18 formed internally of the housing 2 to determine the operative position of the housing on the pipe. In this condition of the connector shown in the drawings, the serrated internal surfaces of the segments 14 are just out of contact with the surface of the pipe, adjacent segments are out of contact with one another, and the O-ring seal 16 slides over the surface of the pipe.

With the relief hole 12 open, grease is pumped through the nipple 10 into the volume 8 until all the air therein is forced therefrom through the hole 12. The hole 12 is then closed by the associated bleed screw which is locked in position.

Further grease is then applied under pressure to the now-closed volume 8 with the result that the grease reacts on the concave outer surface of the resilient ring 6 which is urged into sealing engagement with the walls of the groove 4 and is urged uniformly radially inwardly of said groove 4 carrying the segments 14 with it. Thus the teeth of the serrated internal surfaces of the segments 14 positively engage, and are embedded in, the outer surface of the pipe, the 'O'-ring seal 16 simultaneously being urged by the segments 14 into engagement with said outer surface of the pipe to effect a high pressure dynamic seal therewith.

The spacings between adjacent segments 14 are chosen such that the necessary degree of radially inward movement of the segments 14 to achieve the desired gripping of the pipe can be effected without interference between adjacent segments 14.

In the embodiment of FIGS. 1 and 2, connection of the first-mentioned pipe with a further plain end pipe of larger diameter is achieved by sliding the end of the further pipe into the other end of the housing 2 to abut a shoulder 20 therein, and repeating the procedure described above.

Thus the two pipe lengths are securely connected together, in that each is positively gripped by the associated gripping arrangement within the common housing 2.

The advantages of the described connector over prior devices are numerous.

The independent action of the individual segments 14 enables a pipe other than circular to be positively gripped, in that the segments 14 are able to align themselves with the outer surface of the pipe to accommodate any ovality or the like of the pipe.

Grease can be applied at pressures of the order of 7,000 psi and acts uniformly around the ring 6 to ensure a positive circumferential grip by the segments 14 the hardened teeth of which embed themselves into the pipe whereby the pipe itself can withstand higher internal fluid pressures than heretofore, typically of the order of 55 bar.

Connection to the plain end of the pipe can be achieved without any welding and without the use of nuts and bolts, it only being necessary to utilise a suitable high pressure fluid such as grease.

Any leakage within the pipe is prevented by the 'O'-ring seal 16 which is an integral part of the connector and moves simultaneously with the segments 14, whereby the seal effected thereby is of a dynamic nature. The sealing effect of the ring 16 is always slightly ahead of the gripping effect of the segments 14 because of the protrusion of the ring 16 from said segments 14.

The connectors can be used in conjunction with most types of pipes, whether metal, polyethylene or the like, and are compatible with most scored, pitted or corroded pipes.

The connectors can be attached to the associated pipes extremely quickly and in confined spaces, enabling saving in repair, maintenance and installation costs to be achieved.

The number of segments 14 incorporated in a connector is determined by the size of the pipe in question, and can typically vary from as few as three for a 50 mm diameter pipe, to sixteen for a 300 mm diameter pipe.

Figure 3:
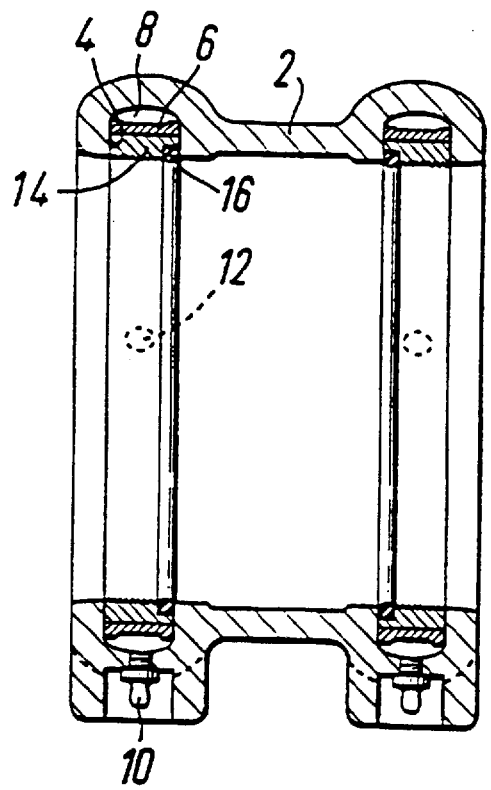
FIGS. 3 and 4 are a longitudinal section on line III—III of FIG. 4 and an end view respectively of a second pipe connector according to the invention.
Figure 4:
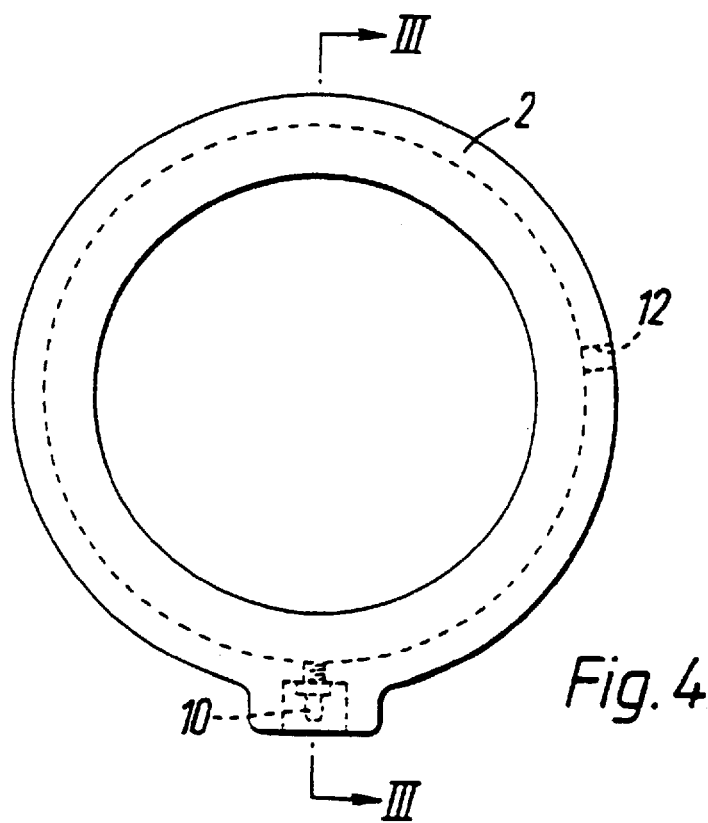

FIGS. 3 and 4 illustrate a connector suitable for joining together two plain end pipes of the same diameter, components equivalent to those of the embodiment of FIGS. 1 and 2 being similarly referenced.

FIGS. 5 and 6 illustrate a connector for attachment to the plain end of a pipe in the manner detailed above, the housing 2 incorporating, or having welded thereto, an annular flange 22 incorporating bolt holes 24 therethrough and which enables the connector to be bolted to an associated device which may be another plain end pipe with a similar flanged connector secured thereto, a valve, a pump or the like. Again components of the embodiment of FIGS. 5 and 6 equivalent to those of the embodiment of FIGS. 1 and 2 are similarly referenced.

I claim:

1. A pipe connector for attachment to a plain end pipe, the connector comprising a housing (2) for location over the pipe, an annular recess (4) formed in the inner surface of the housing (2) to surround the pipe, a first resilient sealing ring (6) located in said annular recess, gripper means located in said recess radially inwardly of said first resilient sealing ring (6), a second resilient sealing ring reacting between the inner surface of the housing (2) and the pipe, and inlet means (10) feeding into said recess (4) for a supply of fluid under pressure, the arrangement being such that, on the application of fluid under pressure to the first sealing ring (6), the gripper means are displaced from inoperative positions into operative positions in gripping engagement with the pipe thereby securely to connect the housing (2) to the pipe, the second resilient sealing ring (16) effecting a fluid-tight seal between the pipe and the housing (2), characterised in that the first sealing ring (6) is disposed between the gripper means and the housing (2) and includes radially inner and outer surfaces the inner of which extends longitudinally of the pipe, the gripper means comprising at least three arcuate segments (14) disposed about the recess and having radially inner and outer surfaces the outer of which extends longitudinally of the pipe, the radially outer surfaces of the segments (14) being engaged by the radially inner surface of the first sealing ring (6), the radially inner surfaces of the segments (14) having formed therein, at the axial extremities thereof, an annular groove in which the second sealing ring (16) is housed to project radially inwards of the radially inner surfaces of said segments (14), the arrangement being such that, on the application of fluid under pressure to the radially outer surface of the first sealing ring (6), the segments (14) are displaced radially inwardly towards the pipe (2) by said first sealing ring (6) into operative positions in which the radially inner surfaces thereof grip the pipe, movement of said segments (14) urging the second sealing-ring (16) radially inwardly towards the pipe into sealing engagement with said pipe and with a sidewall of the housing (2) to effect a fluid-tight seal between the pipe and the housing (2).

2. A connector as claimed in claim 1 in which the radially outer surface of the first sealing ring (6) is of generally concave configuration whereby, on the application of fluid pressure thereto, the opposed side edges of the ring (6) are urged into sealing contact with the opposed sidewalls of the recess (4).

3. A connector as claimed in claim 1 in which the inner surfaces of the segments (14) are serrated.

4. A connector for connecting together two plain end pipes and comprising two connectors as claimed in claim 1, the housings (2) of which are integral with one another.

5. A connector as claimed in claim 1, and including an annular flange (22) integral with, and projecting radially outwardly from, the housing (2).

* * * * *